United States Patent Office 3,352,280
Patented Nov. 14, 1967

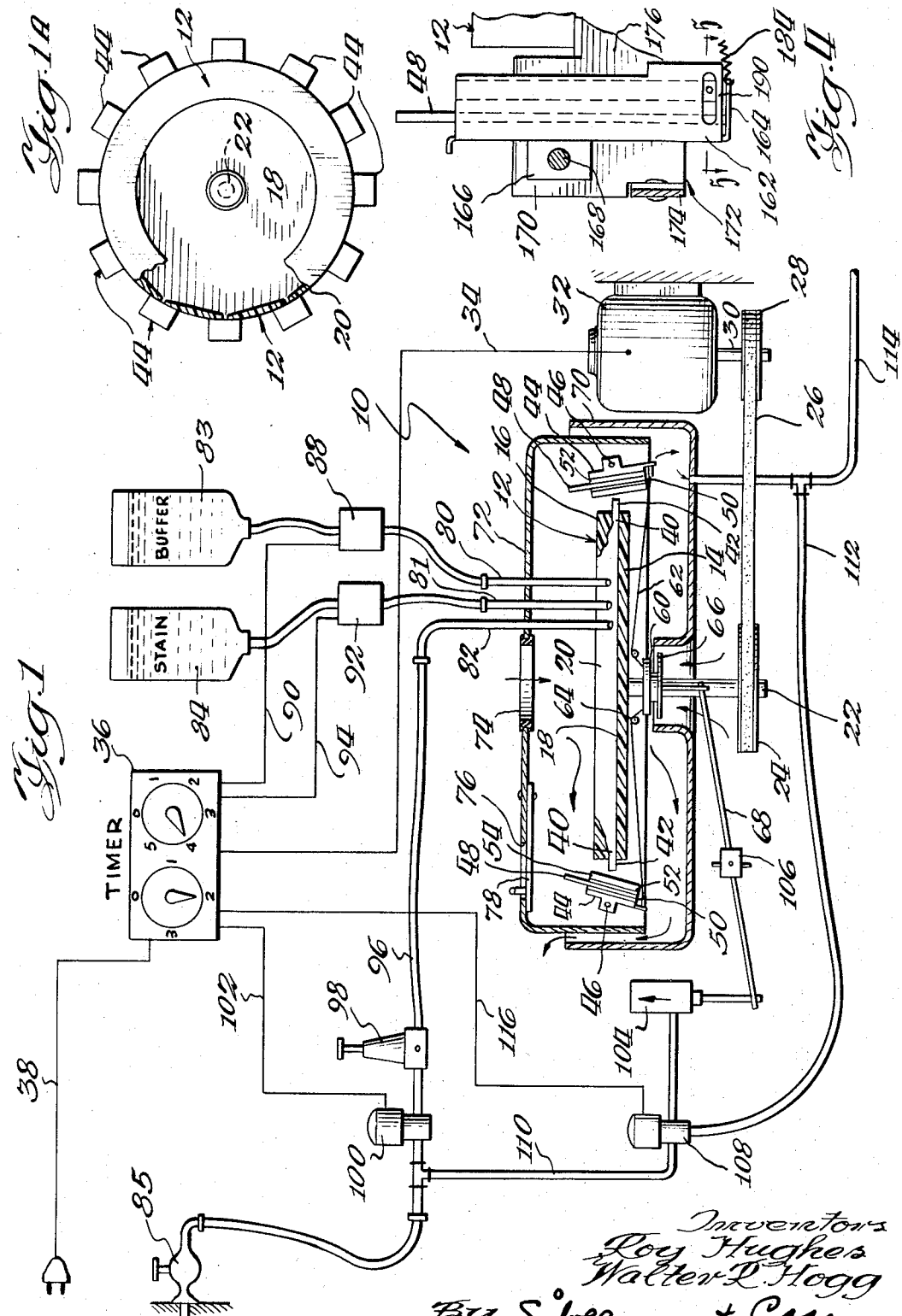

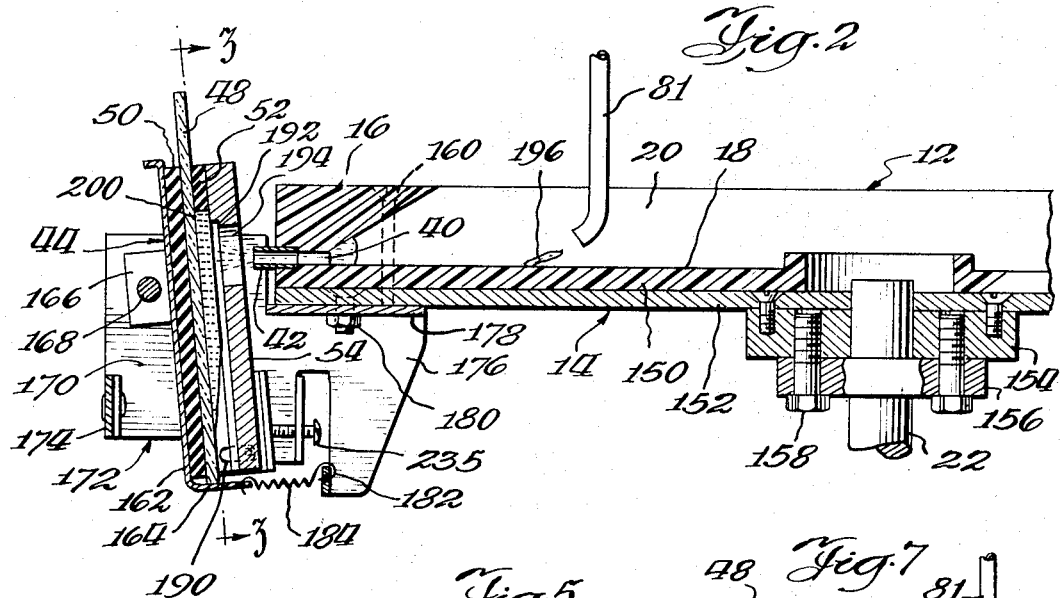
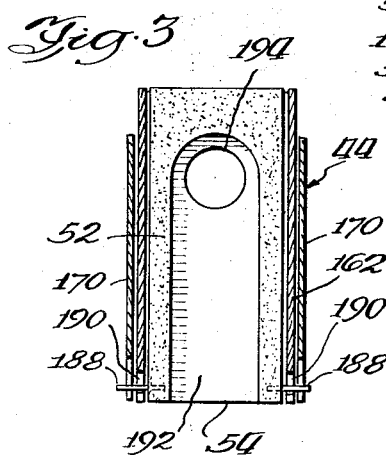
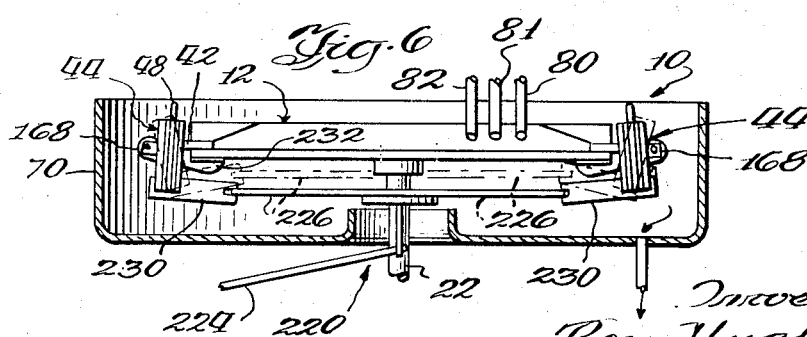

3,352,280
CENTRIFUGAL APPARATUS FOR
SLIDE STAINING
Roy Hughes, Aberdeen, Wash., and Walter R. Hogg,
Miami Springs, Fla., assignors to Coulter Electronics,
Inc., Hialeah, Fla., a corporation of Illinois
Filed May 1, 1964, Ser. No. 364,232
20 Claims. (Cl. 118—9)

This invention relates generally to apparatus for slide staining and, more particularly, is concerned with an automatic centrifugally operated slide staining device.

In medicine, biology and similar fields where it is necessary to view tissues, cultures, specimens and the like under a microscope, it is customary to place the specimen which is to be viewed upon a small glass slide several inches long and about three-quarters of an inch or so wide and perhaps a millimeter thick. Since very little light is reflected from extremely thin specimens or smears, it has become necessary to stain the specimen by a suitable dye. A common type of stain for blood specimens is Wright's stain. The manner in which this has been done in the past has been to pour the stain onto the slide where it remains by surface tension and, after some time, to add a buffer solution to the stained slide to fix the stain on the specimen. Thereafter the slide is tilted to pour off the liquid. Following this, there is a water rinse which clears away the stain from all areas of the slide which have not been stained.

The above procedure is done manually for the most part, and such apparatus as known for increasing the efficiency of staining consists merely of various equipment to enable the manual staining of a large number of slides.

The primary object of the invention is to provide apparatus in which a plurality of slides may be stained automatically without being handled but for inserting and removing them from the apparatus, the staining being done completely automatically, quickly, and with great saving of the solution.

Of necessity, the manual staining of slides has resulted in a lack of uniformity depending upon the time during which the various processes are permitted to proceed, and it is, therefore, another object of the invention to provide slide staining apparatus in which the staining operation is uniform in all respects.

Many other objects will become apparent from the description of the preferred embodiment which follows in connection with which the drawings illustrate the details of the same.

In the drawings:

FIG. 1 is a diagrammatic view of a system utilizing the apparatus of the invention for automatically staining slides, the centrifugal apparatus itself being shown as a simplified form in section.

FIG. 1a is a diagrammatic top view of the centrifugal disc of FIG. 1 showing the fluid receiving station for holding slides.

FIG. 2 is a fragmentary sectional view through a portion of the centrifugal apparatus showing the details of the same, and illustrating a modified form of the invention relating to the means for tilting the slide holder.

FIG. 3 is a sectional view taken generally along the line 3—3 of FIG. 2 and in the direction indicated to show the details of the pressure member for retaining the slide tightly in its holder during rotation of the centrifugal apparatus.

FIG. 4 is a fragmentary side elevational view of the slide holder of FIG. 2 with a slide in place.

FIG. 5 is a sectional view taken on the line 5—5 of FIG. 4 and in the direction indicated.

FIG. 6 is a diagrammatic view of a centrifugal slide staining device of modified form.

FIG. 7 is a fragmentary sectional view of a slide holder of the construction shown in FIG. 6 but in slide drain condition.

The invention basically comprises a rotating disc having a tray-like formation on its upper surface so that liquids may be deposited on the tray portion and spun to disperse them to the outer periphery of the disc. A plurality of radial openings are provided in the disc wall, circumferentially spaced about the periphery thereof so that as the disc is spun, liquids which are deposited in the tray will be ejected through these openings radially outward.

A plurality of slide holders is mounted for rotation with the disc, respectively adjacent the openings provided in the periphery of the disc, each slide holder having an arrangement to retain a slide therein with the slide surface having the specimen facing the axis of the rotating disc and aligned with an opening. There are two positions to which the slide holders may be moved in the first of which liquid applied to the slide will be held on the slide, and in the second of which the liquid will be drained off or thrown off the slide by centrifugal force. Such movement is accomplished by several means which will be described and which can be operated readily while the apparatus is in use.

One phase of the invention is concerned with means for timing the deposit of various fluids onto the tray and changing the disposition of the slide holders relative to the rotating tray so that the liquid may be either retained or drained depending upon the step in the sequence of operation.

Looking now at the drawings in detail, in FIG. 1 there is illustrated a centrifugal apparatus designated generally by the reference character 10, which comprises a disc 12 having an imperforate bottom wall 14 and fluid guide means comprised of a confining annular peripheral wall 16 having fluid conveying passageways therein and forming thereby a central distributing tray configuration. The tray configuration has a rather shallow depth above its surface 18, the latter surface being the top of the plate 14. The tray may be considered as comprising an open-topped chamber 20. The disc member 12 is secured to a vertical shaft 22 having a pulley 24 affixed thereto to enable the disc to be rotated through a belt 26 driven from a pulley 28 which is mounted on the shaft 30 of the motor 32. The power for driving the motor is obtained through the electrical power conductors designated generally 34. In the system shown, the application of electric power is controlled by the timer 36, the timer providing a connection between the conductors 34 and the power leads 38. The motor 32 may have one or more controllable speeds.

The distributing chamber 20 of the disc 12 is provided around its periphery with openings or passageways, two of which are shown at 40 in FIG. 1, so that if any fluids are deposited on the surface 18 while the disc member 12 is being rotated at high speed, the fluids will immediately be distributed radially outward by centrifugal force and through suitable channels or funnel arrangements (not shown) formed in the peripheral wall 16 will be directed to be ejected through the passageways 40. Extensions of the passageways 40 may be provided in the form of small conduits or nozzles 42.

A plurality of slide holders is pivotally connected to the disc member 12 circumferentially spaced thereabout. Two slide holders 44 are shown in FIG. 1, these slide holders being pivotally mounted by means not illustrated in said FIG. 1 but arranged to pivot as indicated at 46. It will be seen that there are slides 48 disposed in the slide holders protruding out of the top thereof, and as will be explained hereinafter, said slides are sandwiched between resilient pressure members 50 and 52 by the centrifugal force of an inner plate 54. The inner resilient member 52, usually formed of sponge rubber, is of the configuration of an inverted U so that a chamber is formed on the face of the slide, the upper end of which is closed off and the lower end of which is open.

A hole in the plate 54 is aligned with a passageway 40 and it will be obvious that there are as many holders 44 as there are passageways. When the disc member 12 is spun, any fluid deposited on the surface 18 will be ejected through the passageways 40 and conduits 42 and enter through the back plate 54 into the chamber previously described.

In FIG. 1, the slide holders are shown with their lower or open ends spaced radially outward of the vertical axis of the shaft 22 by a greater distance than their upper or closed ends. It would be obvious that any fluid which is transmitted from the surface 18 to the chamber formed by the resilient member 52 and the slide surface will be thrown out at the bottom by centrifugal force. When the slide holders are in staining position, their lower ends are closer to the axis of the shaft 22 than their upper ends so that fluids which are applied within the chamber formed on the face of the slide surface will be retained instead of drained.

As will be seen, with the slide holder 44 arranged so that the slide is at an angle of about 5 or 6 degrees relative to the vertical with the lower end closer in to the axis, fluid applied thereto at a fairly fast rate of rotation will form a sort of wedge on the slide surface and be retained so long as the speed is maintained. The arrangement of the holders as shown in FIG. 1 is 15 degrees outward relative to the vertical which has been found ideal for draining of the slides.

Mounted on the shaft 22 for rotation therewith but capable as well of axial movement is a collar 60. Each of the holders 44 is attached to the collar by means of a suitable cable 62 connecting the bottom end of the holder to the collar by way of a small pulley 64 secured to the bottom of the disc plate 14. With the collar 60 in the position shown in FIG. 1, the bottom ends of the slide holders 44 are arranged outwardly and if the collar 60 is moved axially downward as, for example, by a coupling member 66 with a rocking lever 68, the cables 62 will pull radially inward thereby tilting the holders 44 to a position where fluid deposited in the slide chambers will be retained.

As thus far described, the operation of the apparatus should be fairly well understood. Preferably there is a bottom drain pan 70 of annular configuration to catch fluid thrown off from the holders, and there is an annular cover member or shield 72 which has a central air opening 74 and a small window at 76 adapted to be opened by a suitable sliding door 78. Three pipes 80, 81 and 82 are shown mounted in the cover member 72 and connected to reservoirs 83 and 84 and a source of tap water 85, respectively. In each case, flow of liquid from the respective reservoir or source is controlled by means of an electrically operated volumetric dispenser. The dispenser 88 controls flow from the reservoir 83 which may contain the buffer solution and, in turn, is electrically operable through the conductors 90 by the timer device 36. The volumetric dispenser 92 controls the introduction of stain, for example, from the reservoir 84, being operable electrically through the conductors 94 which connect the same to the timer 36. As for the pipe 82, it receives its water supply by way of the conduit 96 through the pressure regulator 98 and the valve 100, this latter being electrically operated by the timer 36 through the electrical connections 102.

The other apparatus shown diagrammatically in FIG. 1 comprises a hydraulic cylinder 104 designed to rock the arm 68 on the fulcrum 106 when suitably energized by the valve 108. It will be seen that the valve 108 receives its fluid supply from the tap by the way of the conduit 110 and drains the same by way of the conduit 112 into the principal drain 114 that is connected to the bottom pan 70. The valve 108 is also operated from the timer 36 electrically through the connections 116.

The operation of the apparatus described is as follows:

Assume that the laboratory technician has taken a plurality of blood smears on slides and has inserted the same in the slide holders 44. The slide holders in this case are tilted with their lower ends closer radially inward and the back plates 54 are loose so that the slides are easily inserted. The stain to be used may consist of Wright's stain with a suitable buffer solution. The timer dials are manually set for the desired stain and buffing times. All of the connections and conduits are completed, the water supply from the source 85 is turned on and the motor commences to spin the disc member 12.

Valve 108 may at this time be opened to pull the right-hand end of the arm 68 downwardly if it has not previously been accomplished so that the proper disposition of the holders is achieved.

The volumetric dispenser 92 is now opened by the timer 36 dispensing a predetermined amount of stain through the water shield 72 onto the surface 18 of the rotor, the centrifugal action of the rotor evenly dispenses the stain to each individual passageway 40 and thence through the tubular spouts 42 through the slide holder plate 54 onto the surface of the slide. As previously stated, and as will be specifically described hereinafter, a wedge of stain is retained on the surface of the slide due to the centrifugal force and the inclined position of the slide holder. This is preferred to be approximately 5 or 6 degrees. When the proper amount of time has passed, the volumetric dispenser 88 will open and dispense a predetermined amount of buffer solution onto the surface 18 which will be added to the stain to fix the stain on the specimen. Thereafter the valve 100 opens and water is admitted by way of the conduit 96 and the pipe 82 to the surface 18. At the same time the valve 108 closes, the hydraulic cylinder 104 moves the left-hand end of the lever 63 downward causing the slide holders 44 to assume the positions shown in FIG. 2. All of the fluids which have been retained by the slide holder will be thrown off centrifugally, drained down into the lower drain member 70 out through the drain 114, and the water which flows through the slide holders will also wash off the slide. Thereafter the disc member 12 may be permitted to rotate for any length of time which experience has shown will enable the slides to dry. Air will enter through the opening at the top 74 and circulate through the confines of the apparatus as defined by the water shield 72 and the drain 70, and if desired, additional air may be pumped in.

FIG. 2 is a more detailed view of the disc member 12 and the slide holder 44, but in addition, it shows one method of securing the slide holder to the disc member 12 and a different structure for enabling the movement of the slide holder between its two positions.

Referring to FIGS. 2 to 5, the disc member 12 is formed of plastic, and conveniently, the bottom surface 18 of the distributing chamber 20 consists of the upper face of the plastic member 150 which, in turn, is fastened to a metal plate 152. These two members 150 and 152 together comprise what has been referred to above as the bottom plate 14. A ring 154 is shown secured to the metal plate 152, and the shaft 22 has an enlarged flange 156 which is coupled to the collar 154 by suitable fastening means 158. Obviously any other arrangement will suffice. If desired, the wall 16 may be separate from the plastic plate 150, and hence held by suitable fasteners 160.

The slide holder 44 is shown provided with a frame portion 162 having a bottom radially inwardly extending arm 164. A pair of lugs 166, which may be struck up from the frame 162, enable the holder 44 to be pivotally mounted on a shaft 168 that extends between the sides 170 of the housing 172. The housing 172 may have side walls connected by suitable structural members 174 and also may have forwardly extending arms 176 connected by means of a web 178 bolted to the bottom of the plate 152 as shown at 180. A cross member 182 is arranged opposite the end of the arm 164, and a strong helical spring 184 is connected between the arm 164 and the cross member 182. Obviously if the holder pivots on the shaft 168, it will normally be pulled inward by the spring so that its bottom end is radially inward relative to its top end. The frame 162 has the resilient member 50 preferably cemented to the interior thereof, this resilient member being formed of some material such as foam rubber and adapted to be engaged by the rear surface of the slide 48. The radially inward portion of the slide holder includes the loosely disposed heavy plate 54 which has a pair of protruding pins 188 adapted to cooperate with slots formed at 190 in the frame 162 to prevent dislodgment from the holder 44. The front surface of the plate 54 may be grooved or routed as shown at 192 and is provided with the previously referred to resilient member 52. As seen in FIG. 3, the member 52, which is also preferably formed of foam rubber, has an inverted U-shaped configuration and is aligned with the routed inner surface 192 of the plate 54 so that, when fluid is applied to the slide 48 retained in the holder 44, there will be a sufficient space to enable the strain and/or buffer solution to be retained. The plate 54 has an opening 194 which, as shown, is aligned with the passageway 40 and the nozzle or tube 42 so that fluid thrown out of the latter will enter the hole 194 and impinge against the radially inward facing surface of the slide 48.

As seen in FIG. 2, a pipe such as, for example, 81 drops fluid designated generally 196 onto the surface 18 and such fluid finds its way through the passageway 40, is applied onto the surface of the slide 48 and will usually build up as a wedge during the rotation of the disc 12 with the holder 44 in the condition shown in FIG. 2. Such wedge is indicated at 200.

When it is desired to discharge the stain and buffer solution and rinse the slide, in the form of the invention shown in FIG. 2, the speed of the motor is increased until the centrifugal force applied to the bottom end of the holder 44 is greater than that at the top. For this reason it will be seen that the pivot shaft 168 is located substantially above the center of gravity of the slide holder 44. When this occurs, the slide holder will tilt in an opposite direction, that is, with the open end of the chamber formed by the member 52 and the surface of the slide 48 outwardly against the bias of the spring 184 at which time any fluids applied thereto will drain off and be carried away.

FIGS. 6 and 7 are fragmentary views, more or less diagrammatic, showing a modified form of the invention in which, instead of using either of the forms shown and described for tilting the slide holder 44, the slide holder is provided with a radially inward extending arm 230 having a notch or saddle 234. Instead of the collar 60, or secured thereto, there may be a arge disc 222 mounted to rotate with the shaft 22, and the disc is capable of being moved up and down by the same or a similar mechanism previously described. The solid lines in FIG. 6 and FIG. 7 show the position of the slide holder 44 when the slide is being rinsed, and the disc 222 is downward. The phantom lines of FIG. 6 show the same structure except that the disc has now moved upward rotating the slide holder about its pivot point to the condition in which the slide is to be stained.

In FIGS. 6 and 7, the apparatus is designated generally 220. The disc 222 can be selectively moved in the direction of the arrows seen in FIG. 7, i.e., parallel with the axis of shaft 22, by means of linkage 224, connected to the disc 222. The marginal edge 226 of the disc 222 engages in the substantially V-shaped slot 228 opening to one end of the actuating finger or arm 230 mounted to the frame of the holder 44. The holder 44, in turn, is pivotally mounted at 168 to a bracket 232 depending from the underside of the rotating member 12. A bracket 232 is provided for each holder 44. When disc 222 is raised, it engages the wall 234 of the slot to tilt the finger and hence member 44 to the phantom-line position shown in FIG. 6 so that the bottom end of the slide holder is tilted inwardly. When the disc 222 is lowered, the slide holder 44 is tilted to the solid line position of FIG. 6 where the bottom end of the holder 44 is tilted outwardly.

There is provided adjustment stop means 235 in FIG. 2 to limit or adjust the initial tilt position of the holder for receiving the slide 48.

It will be obvious that modifications of the invention are capable of being made without departing from the spirit and scope of the invention as defined in the appended claims.

What it is desired to secure by Letters Patent in the United States is:

1. A slide staining apparatus comprising a disc arranged for rotation on a vertical axis, said disc having fluid guide means associated therewith to conduct fluid applied to the upper surface of said disc to predetermined points on the peripheral edge thereof by centrifugal force when said disc is rotating and to permit the discharge of said fluid at said points, a plurality of slide holders each adapted to receive a slide therein with a surface of the slide generally parallel with and facing said axis, said holders being coupled for rotation with said disc, said holders being spaced about said peripheral edge at points that correspond to said discharge points, means for rotating the disc whereby the fluid is transmitted from said guide means to said holders to engage said slide surfaces during rotation, and means for permitting the drainage of said fluid from said slide surfaces while the disc is rotating.

2. Apparatus as claimed in claim 1 in which the holders are mounted for movement relative to the disc between at least two positions during rotation, each holder having means for retaining transmitted fluid on said surface in one position and for permitting the fluid to be removed from said surface when in said second position.

3. Apparatus as claimed in claim 1 in which each holder has means for receiving a slide therein in a sandwiched relation including a member for backing the slide and a member adapted to engage the slide face, the latter member comprising a normally loose plate having an opening therein and a resilient pressure member of generally U-shaped configuration on the portion of the plate disposed adjacent the slide face and adapted to form a fluid tight open end chamber with said slide when rotation of said disc presses said plate against said slide face by centrifugal force.

4. Apparatus as claimed in claim 1 in which said holders are pivotably mounted with respect to said disc and have means to swing one end of each holder either closer to or further from the axis than the other end thereof, means forming an open end but otherwise enclosed chamber with the said slide surface, whereby fluid engaging the slide surface when said one end of the holder is closer to the axis of rotation will be retained thereon, but said fluid will be thrown off when said one end is further from said axis.

5. Apparatus as claimed in claim 3 in which said fluid guide means includes a peripheral wall on said disc and passageways therein to convey fluid to the holder plate openings aligned therewith.

6. A slide staining apparatus for depositing fluid from a source on the surface of a slide comprising a horizontally disposed rotatable tray having a peripheral wall, radially disposed conduits in said wall, slide holders mounted to the tray and having passageways, there being a passageway aligned with each conduit, a slide chamber in each holder adapted to receive a slide therein with the passageway aligned with a surface of the slide to receive fluid discharged from the tray and transmitted through the conduits and passageways by centrifugal force, means associated with said chamber to permit the drainage of said fluid, while the tray is rotating, and means for rotating the tray.

7. An apparatus as claimed in claim 6 in which said apparatus comprises means to pivot said holders while the tray is rotating, said means pivoting said holders between a first fluid retaining position wherein the holder is disposed at an angle with respect to the axis of rotation of the tray and a second fluid draining position wherein the holders are disposed substantially parallel to the axis of rotation.

8. An apparatus as claimed in claim 7 in which said means to cause said pivotal movement comprises tensile means connected between a swingable part of each holder and said tray and resiliently retaining the holders in the fluid retaining position while said tray is rotating at a speed below a predetermined rate, and said part having sufficient mass such that the centrifugal force acting on said part above said predetermined rate overcomes the effect of said tensile means to permit said holders to move to said fluid draining position.

9. An apparatus as claimed in claim 7 in which said rotating means for the tray includes a shaft, said pivot means comprising an axially adjustable member secured to said shaft for rotation therewith but capable of axial movement on said shaft, means interconnecting one end of each holder to said axially adjustable member, said connection being such that axial movement of said axially adjustable member will swing said holders between said fluid retaining and fluid draining positions.

10. An apparatus as claimed in claim 9 in which the end of said holders is the bottom end, and the major portion of each holder is below the pivot point such that the centrifugal force created by the rotation of the tray is sufficient to overcome the weight of the axially adjustable member and will swing the said bottom ends outward to the draining position, and in which said connection is afforded by flexible cables connected between holders and said axially adjustable member respectively.

11. An apparatus as claimed in claim 9 in which said interconnecting means for the holder and the axially adjustable member comprises a notch in the said one end of each holder and said axially adjustable member has its circumferential edge engaged in said notches so that axial movement of the axially adjustable member will swing said holder between said fluid retaining and fluid draining positions.

12. A slide staining apparatus comprising a disc arranged for rotation on a vertical axis, said disc having fluid guide means to conduct fluid applied to a surface of said disc to predetermined points on the peripheral edge thereof by centrifugal force when the disc is rotating, a plurality of slide holders each adapted to receive a slide therein with a surface of the slide generally parallel with and facing said axis, said holders being coupled for rotation with said disc and spaced circumferentially about said periphery in registration with said predetermined points, each holder having means cooperating with a slide when installed therein to form a chamber with said surface and said chamber being closed at one end and open at the other end of said surface, means for rotating said disc, means for moving said holders during rotation between two positions, one position of which has the open end of said chamber further radially outward from said axis than said closed end, the other position of which is with the said open end closer to said axis than it is in said one position, means associated with said holder for transmitting fluid from said fluid guide means to said chambers respectively during rotation while said holders are in either position.

13. A slide staining apparatus comprising a disc arranged to rotate on a vertical axis, said disc having fluid guide means arranged about its periphery to conduct fluid applied to the upper surface of said disc to predetermined points on the exterior thereof, a plurality of slide holders arranged generally parallel to the said axis and secured to said disc spaced about said periphery, said holders each having means for cooperating with a slide engaged therein to form a chamber with the inward face of the side closed at one end and open at the other end, means for rotating said disc, and means for moving said holder during rotation between two positions one of which has the open end further radially outward from said axis than said closed end, means associated with said holders for conducting fluid to said chambers respectively from said guide-means during rotation.

14. Slide staining apparatus comprising centrifugal fluid distributing means arranged to receive a quantity of fluid for distribution thereof, a plurality of slide holders carried by said distributing means in fluid receiving disposition, means for rotating the distributing means to radially distribute said fluid, means for transmitting said fluid from said distributing means to slides held in said holders during rotation of said distributing means, and means associated with said holders for facilitating the drainage of fluid deposited on the slide carried thereby while the distributing means is rotating.

15. Apparatus as claimed in claim 14 in which means are provided for holding the fluid on said slides for a predetermined time and thereafter releasing said fluid from said slides.

16. Slide staining apparatus comprising a rotary member having means for pivotally supporting a plurality of slides at a predetermined point on the periphery of said rotating member, said slides being pivotal to and from a fluid retaining position and a fluid draining position, means for moving said slide support means between said positions while the rotary member is rotating, means to rotate the rotary member, at least two sources of fluid arranged to discharge fluid in said rotary member and said rotary member having means to distribute the fluid to said slide support means, and programming means controlling the discharge of fluid.

17. A structure as claimed in claim 16 in which said programming means is connected to operate said moving means while controlling said discharge of fluid in said rotary means.

18. Apparatus for treating with liquid a plurality of objects comprising: a plurality of stations each adapted to hold one of said objects, receive treating liquid, and have such liquid drained therefrom, a rotatable liquid distributing member, means supporting said stations in predetermined radial positions onto said rotatable liquid distributing member, said member having an annular tray structure mounted in a horizontal plane and further having a peripheral surface containing liquid channels which are radially aligned with said stations, liquid conduit means for discharging liquid into said stations via said channels while said member is rotating, and means for facilitating the drainage of liquid from said stations while said member is rotating.

19. Apparatus as claimed in claim 18 in which the means for facilitating the drainage of liquid comprises a rotary drive device connected to said tray to rotate the same.

20. Apparatus as claimed in claim 18 in which said stations each include a slide holder pivotally secured to the periphery of said tray structure.

References Cited

UNITED STATES PATENTS

| | | | |
|---|---|---|---|
| 1,906,548 | 5/1933 | Davis | 134—145 X |
| 2,054,155 | 9/1936 | Dulken | 118—52 X |
| 2,612,443 | 9/1952 | Goetzel et al. | |
| 2,717,608 | 9/1955 | Baldwin | 134—145 X |
| 3,017,854 | 1/1962 | O'Brien | 118—52 X |
| 3,097,112 | 7/1963 | Schultze et al. | 118—52 X |

CHARLES A. WILLMUTH, *Primary Examiner.*

J. P. McINTOSH, *Assistant Examiner.*